United States Patent Office 2,968,590
Patented Jan. 17, 1961

2,968,590

SYNERGISTIC BORIC ACID FUNGICIDAL COMPOSITIONS

Jean Ploquin, Surgeres, France, assignor to Etablissements Sergent Laboratoires Prolac, Surgeres, France, a French company No Drawing. Filed June 19, 1956, Ser. No. 592,244

4 Claims. (Cl. 167—14)

The present invention relates to a new and useful series of antifungal products characterized by remarkable properties and to procedure for protecting articles therewith. This application is, in part, a continuation of my copending application Ser. No. 493,042, filed March 8, 1955, now abandoned.

Numerous products have already been proposed for combatting molds especially borates, but these products for the most part present certain disadvantages and inconveniences, including disagreeable and tenacious odors, very feeble remanence, high toxicity, difficulties of use due to dangers in handling (dermatitis, animal or vegetable tissue necrosis, professional poisoning, etc.), solubility in a very limited number of solvents, fungicidal activity limited only to certain species, and development of dangerous habituation.

J. R. Winston (U.S. Dept. Agr. Tech. Bulletin No. 438 (1935)) has shown that borax and boric acid are the most indicated from the point of view of convenience of use, economy and effectiveness. This has since been confirmed by:

F. Lauriol: Fruits 1950—6—412—420; Fruits 1952—7—465—475.
Reichert and Littauer: Preliminary Disinfection Experiments Against Mould Wastage in Oranges—Hadar IV—1931.
Putterill and Dreyer: Union of South Africa Dept. Agr. and Forestry—Bull. No. 167—1936.
Reiniger: O. Campo, 1937, December, 45–48.
Fioller and Tomkins: Ann. Rept. Food Investn. Bd., London, for 1938—p. 189.
Tindale: Orange Storage Experiments 1948—Dept. Agr., Victoria.
Hall and Long: Agr. Gaz. N.S.W., 1950 December, I, 631–635–662.
Cassin: Fruits et Primeurs de l'Afrique du Nord, 1952, January 18–20.

Borax is rather sparingly soluble in water and to be effective the operation must be conducted at about +45° C. Moreover, these boracic treatments can, in certain cases, considerably augment the transpiration and cause desiccation of the fruits (see in particular, Lauriol, Fruits (1954) of 9–3–15).

Finally, boron derivatives, utilized up to now as antiseptics, exhibit only a very feedble antifungal activity in comparison to other commonly used compositions, such as copper salts, copper oxides, sulfurized combinations, and organic products.

The present invention has for an object new antifungal products obtained from boron derivatives but which present the peculiarity that the components which enter into their composition give rise to an antifungal synergism whence results a remarkable efficacy without the above-reported inconveniences of prior boracic treatments.

Products according to the invention are characterized by being composed of:

(a) At least one member of the group consisting of the oxygenated acid and anhydride derivatives of boron, their salts and esters;

(b) At least one organic compound having in its formula two identical or different radicals selected from the group consisting of OH, $NH_2$, and NH, these two radicals being in the $\alpha$ or $\beta$ position from one another, and the said organic compound being employed in the proportion of 0.2 to 5 mols per mol of boric anion and preferably in the proportion of about 0.5 mol per mol of boric anion;

(c) At least one organic or mineral base in an amount sufficient to make the pH of the product in the neighborhood of or above 9.

Oxygenated derivatives of boron according to (a) above may be boric anhydride, its products of polymerization (or of condensation) and hydration, for example, $B_2O_3$, $BO_2H$, $BO_3H_3$, $B_4O_7H_2$, in their various salt and ester forms, for example $B_4O_7Na_2IOH_2O$, $BO_2K$, $B(C_2H_5O)_3$ without, however, limitation thereto.

Non-limitative examples of organic compounds according to (b) above are tartaric acid, citric acid, lactic acid, halogenated or unhalogenated salicylic acid, the glycols, glycerols and ortho-diphenols.

Non-limitative examples of bases according to (c) above are the hydroxides of copper, zinc, sodium, potassium, calcium, and ammonia, the ethanolamines, laurylamine, cyclohexylamine, and morpholine.

According to the invention, the above compositions are obtained by simple mixture, preferably at the boiling point, the mixture of the products of (a) and (b) above being preferably effected before mixture with a compound according to (c) above.

The compositions thus obtained can be used as such or spread with water or other liquid (particularly with brine), or, alternatively, absorbed in supports or vehicles, such as precipitated carbonate of lime, an infusorial earth or a clay, or incorporated in cream emulsions having a base of wax, colophony, paraffin, and soaps, or incorporated in pigments, according to the intended application, and the invention encompasses all the new products thus obtained.

The importance of the conditions of pH and of molar ratios indicated above is evidenced by the following experiments:

EXPERIMENTAL WORK

A solution according to the invention composed of a mixture of boric acid, lactic acid, and sodium hydroxide was taken as the basis for comparison.

A series of nine solutions of this type all containing 6.2% of boric acid were prepared and the proportions of the two other constituents were varied in a manner to obtain molar ratios of boric acid to lactic acid equal, respectively, to ½, 1 and 2, and a pH of about 5, 7, and 9, respectively.

These nine solutions were designated A, B, C, D, E, F, G, H, and I and were characterized as follows:

[Boric acid (6.2%)]

|  |  | Solutions |
|---|---|---|
| $\dfrac{\text{Boric acid}}{\text{Lactic acid}} = \frac{1}{2}$ | pH=5.1 | A |
|  | pH=7.2 | B |
|  | pH=9.2 | C |
| $\dfrac{\text{Boric acid}}{\text{Lactic acid}} = 1$ | pH=5 | D |
|  | pH=7.2 | E |
|  | pH=9.3 | F |
| $\dfrac{\text{Boric acid}}{\text{Lactic acid}} = 2$ | pH=5.2 | G |
|  | pH=7.1 | H |
|  | pH=9.2 | I |

There was taken a standard culture medium constituted of malt base agar in which there was diluted each of the above solutions to concentrations of 5%, 10%, and 20%, thus constituting 27 experimental culture media, and each of these culture media was placed in two circular Petri boxes, 60 mm. in diameter, with rigorously flat bottoms (54 Petri boxes).

After sterilization, there was deposited on a point of the surface of the medium contained in each of these Petri boxes a drop of suspension of the pathogenic fungi of citrus fruits.

*Pencillium italicum* (27 Petri boxes)
*Phomosis citri* (27 Petri boxes)

The diameter of the fungal colonies was measured throughout three weeks. The diameter could not exceed 60 mm. (the diameter of the box), and, hence, when this diameter is mentioned, it indicates that the fungus had invaded the entire culture medium.

The results were collected in the following tables:

*Penicillium italicum*

| | A | | | B | | | C | | |
|---|---|---|---|---|---|---|---|---|---|
| | 1 week | 2 weeks | 3 weeks | 1 week | 2 weeks | 3 weeks | 1 week | 2 weeks | 3 weeks |
| 5% | 2 | 5 | 10 | 2 | 3 | 8 | 0 | 0 | 0 |
| 10% | 0 | 2 | 5 | 0 | 3 | 5 | 0 | 0 | 0 |
| 20% | 0 | 0 | 0 | 0 | 0 | 0 | 0 | 0 | 0 |

| | D | | | E | | | F | | |
|---|---|---|---|---|---|---|---|---|---|
| | 1 week | 2 weeks | 3 weeks | 1 week | 2 weeks | 3 weeks | 1 week | 2 weeks | 3 weeks |
| 5% | 2 | 5 | 10 | 2 | 4 | 8 | 0 | 0 | 0 |
| 10% | 0 | 2 | 5 | 0 | 3 | 5 | 0 | 0 | 0 |
| 20% | 0 | 0 | 0 | 0 | 0 | 0 | 0 | 0 | 0 |

| | G | | | H | | | I | | |
|---|---|---|---|---|---|---|---|---|---|
| | 1 week | 2 weeks | 3 weeks | 1 week | 2 weeks | 3 weeks | 1 week | 2 weeks | 3 weeks |
| 5% | 0 | 0 | 2 | 0 | 0 | 0 | 0 | 0 | 0 |
| 10% | 0 | 0 | 0 | 0 | 0 | 0 | 0 | 0 | 0 |
| 20% | 0 | 0 | 0 | 0 | 0 | 0 | 0 | 0 | 0 |

*Phomosis citri*

| | A | | | B | | | C | | |
|---|---|---|---|---|---|---|---|---|---|
| | 1 week | 2 weeks | 3 weeks | 1 week | 2 weeks | 3 weeks | 1 week | 2 weeks | 3 weeks |
| 5% | 25 | 55 | 60 | 30 | 55 | 60 | 0 | 5 | 5 |
| 10% | 20 | 50 | 60 | 15 | 50 | 60 | 0 | 0 | 0 |
| 20% | 0 | 0 | 0 | 0 | 0 | 0 | 0 | 0 | 0 |

| | D | | | E | | | F | | |
|---|---|---|---|---|---|---|---|---|---|
| | 1 week | 2 weeks | 3 weeks | 1 week | 2 weeks | 3 weeks | 1 week | 2 weeks | 3 weeks |
| 5% | 30 | 55 | 60 | 25 | 50 | 60 | 0 | 0 | 0 |
| 10% | 25 | 50 | 60 | 25 | 55 | 60 | 0 | 0 | 0 |
| 20% | 0 | 0 | 0 | 0 | 0 | 0 | 0 | 0 | 0 |

| | G | | | H | | | I | | |
|---|---|---|---|---|---|---|---|---|---|
| | 1 week | 2 weeks | 3 weeks | 1 week | 2 weeks | 3 weeks | 1 week | 2 weeks | 3 weeks |
| 5% | 16 | 30 | 40 | 14 | 30 | 40 | 0 | 0 | 0 |
| 10% | 8 | 20 | 30 | 10 | 18 | 25 | 0 | 0 | 0 |
| 20% | 0 | 0 | 0 | 0 | 0 | 0 | 0 | 0 | 0 |

It clearly appeared from this that the fungicidal power was distinctly increased when the pH was above about 9 and that the most efficacious solutions corresponded to molar ratios of boric acid to lactic acid of about 2.

There further appeared what was entirely unpredictable—namely, that at the dose of 5%, the fungicidal power of a solution according to the invention containing 6.2% of boric acid (0.17% of $B_2O_3$) was very clear whereas the existing practice and the laboratory experiments indicated that borax was effective only in a 10% solution (i.e., for 3.65% of $B_2O_3$). Such synergism was confirmed by practice trials on an industrial scale.

This synergistic effect was further evidenced by the following tests:

Into Petri boxes with rigorously flat bottoms there was poured a culture medium of malt base agar in a manner to obtain a disk of uniform thickness sown in the mass with a very homogeneous suspension of spores of a definite fungus.

Disks of filter paper of 1 cm. diameter were impregnated with 0.1 cc. of the solution to be studied (see below), and each of the thus impregnated disks was placed in the center of the surface of the culture medium of one of the Petri boxes prepared as described above. The whole was stoved at 25° C. Circles of inhibition formed around the disks. At the end of 8 hours the diameter of the circle was measured in millimeters, from which was subtracted 10 mm. representing the diameter of the disk of filter paper; the value thus obtained was a measure of the antifungal power.

The tests were carried out on the following solutions which presented much the same pH (about 9) and in which the concentrations of the constituents were chosen in such manner that a complex solution according to the invention (7, 8, 9, 10 or 11) restricted the constituents to the same concentrations as the simple solutions (1, 2, 3, 4, 5, 6 or 12).

For example, from the point of view of concentration of boric and lactic acids, solution 6 is equal to solution 1+solution 3.

Solution 1:
  Boric acid _____ 100
  Ammonia _____ 273
  Water _____ 627

Solution 2:
  Boric acid _____ 100
  Triethanolamine _____ 242
  Water _____ 658

Solution 3:
  Lactic acid _____ 145
  Ammonia _____ 272
  Water _____ 583

Solution 4:
  Lactic acid _____ 145
  Triethanolamine _____ 242
  Water _____ 613

Solution 5:
  Glycerine _____ 150
  Ammonia _____ 2
  Water _____ 848

Solution 6:
  Hexylene glycol _____ 190
  Triethanolamine _____ 5
  Water _____ 805

Solution 7:
  Boric acid _____ 100
  Lactic acid _____ 145
  Ammonia _____ 545
  Water _____ 210

Solution 8:
  Boric acid _____ 100
  Lactic acid _____ 145
  Triethanolamine _____ 484
  Water _____ 271

Solution 9:
    Boric acid _____ 100
    Glycerine _____ 150
    Ammonia _____ 275
    Water _____ 475
Solution 10:
    Boric acid _____ 100
    Hexylene glycol _____ 190
    Triethanolamine _____ 247
    Water _____ 463
Solution 11:
    Boric acid _____ 100
    Methylene glycol _____ 125
    Triethanolamine _____ 247
    Water _____ 528
Solution 12:
    Methylene glycol _____ 125
    Triethanolamine _____ 5
    Water _____ 870

The fungi on which the tests were carried out were the following:

*Penicillium album*
*Aspergillus niger*
*Aspergillus glaucum*
*Mucor racemosus*

The diameters of inhibition observed at the end of 8 hours, as described above, were collected in the following table:

*Observed diameter of inhibition in mm.*

| Experimental Products | P. album | Asp. glaucum | Asp. niger | Mucor racemosus |
|---|---|---|---|---|
| Solution 1 | 16 | 13 | 14 | 9 |
| Solution 2 | 17 | 11 | 12 | 10 |
| Solution 3 | 2 | 2 | 2 | 1 |
| Solution 4 | 1 | 3 | 2 | 1 |
| Solution 5 | 2 | 1 | 0 | 0 |
| Solution 6 | 2 | 3 | 1 | 1 |
| Solution 7 | 24 (synergism) | 19 (synergism) | 20 (synergism) | 17 (synergism) |
| Solution 8 | 22 (synergism) | 20 (synergism) | 19 (synergism) | 20 (synergism) |
| Solution 9 | 20 (synergism) | 21 (synergism) | 18 (synergism) | 16 (synergism) |
| Solution 10 | 26 (synergism) | 19 (synergism) | 19 (synergism) | 21 (synergism) |
| Solution 11 | 23 (synergism) | 21 (synergism) | 21 (synergism) | 18 (synergism) |
| Solution 12 | 0 | 2 | 0 | 0 |

It clearly appears from the above table that the association of compounds according to the present invention produced a marked synergistic effect which was absolutely unpredictable from the actual state of the technics.

It will be noted, in particular, that if this synergism had not been produced, there would have been found for each solution, according to the invention (7, 8, 9, 10, and 11), as a maximum the sum of the results obtained with the corresponding simple solutions.

The comparison is given below:

| | Fungus | Theoretical Result | Observed |
|---|---|---|---|
| Sol. 7=Sol. 1+Sol. 3 | P. album | 16+2=18 | 24 |
| | A. glaucum | 13+2=15 | 19 |
| | A. niger | 14+2=16 | 20 |
| | Mucor racemosus | 9+1=10 | 17 |
| Sol. 8=Sol. 2+Sol. 4 | P. album | 17+1=18 | 22 |
| | A. glaucum | 11+3=14 | 20 |
| | A. niger | 12+2=14 | 19 |
| | Mucor racemosus | 10+1=11 | 20 |
| Sol. 9=Sol. 1+Sol. 5 | P. album | 16+2=18 | 20 |
| | A. glaucum | 13+1=14 | 21 |
| | A. niger | 14+0=14 | 18 |
| | Mucor racemosus | 9+0=9 | 16 |
| Sol. 10=Sol. 2+Sol. 6 | P. album | 17+2=19 | 26 |
| | A. glaucum | 11+3=14 | 19 |
| | A. niger | 12+1=13 | 19 |
| | Mucor racemosus | 10+1=11 | 21 |
| Sol. 11=Sol. 2+Sol. 12 | P. album | 17+0=17 | 23 |
| | A. glaucum | 11+2=13 | 21 |
| | A. niger | 12+0=12 | 21 |
| | Mucor racemosus | 10+0=10 | 18 |

In every case, the observed result was superior to the theoretical result obtained by adding the effects of the constituents, in the same conditions of pH and of concentration, thus clearly proving the synergistic effect peculiar to the solutions of the invention.

By way of non-limitative example, several formulas for compositions according to the invention are set forth below:

EXAMPLE 1

Dissolve the following mixture by moderate warming:

|  | Kgs. |
|---|---|
| Boric acid | 100 |
| Lactic acid (80%) | 90 |
| Triethanolamine | 715 |
| Water | 95 |

After dissolution, bring back the total weight to 1000 kgs. by addition of water to compensate for evaporation.

EXAMPLE 2

First dissolve as in the preceding example:

|  | Kgs. |
|---|---|
| Boric acid | 42 |
| Lactic acid (80%) | 148 |
| Triethanolamine | 100 |
| Water | 35 |

Then, after cooling, add with agitation:

Ammonia (22° Bé.) _____ 200

EXAMPLE 3

Dissolve hot, near the boiling point, the following mixture:

|  | Kgs. |
|---|---|
| Boric acid | 53 |
| Lactic acid (80%) | 48 |
| Triethanolamine | 384 |
| Sodium chloride | 139 |
| Water | 376 |

EXAMPLE 4

Dissolve cold:

|  | Kgs. |
|---|---|
| Boric acid | 80 |
| Methylene glycol | 200 |
| Triethanolamine | 500 |
| Water | 220 |

EXAMPLE 5

Dissolve cold:

|  | Kgs. |
|---|---|
| Boric acid | 89 |
| Hexylene glycol | 342 |
| Triethanolamine | 569 |

EXAMPLE 6

|  | Kgs. |
|---|---|
| Boric acid | 62 |
| Lactic acid (80%) | 58 |
| Caustic soda | 80 |
| Water | 800 |

EXAMPLE 7

| | Kgs. |
|---|---|
| Sodium borate decahydrate ($B_4O_7Na_2, 10H_2O$) | 100 |
| Lactic acid (80%) | 58 |
| Caustic soda | 62 |
| Water | 780 |

EXAMPLE 8

| | Kgs. |
|---|---|
| Sodium pentaborate decahydrate ($B_{10}O_{16}Na_2, 10H_2O$) | 88 |
| Lactic acid (80%) | 88 |
| Caustic soda | 124 |
| Water | 700 |

In Examples 7 and 8, contrary to the general method the soda was dissolved in the water, then the borate or the pentaborate, and finally the lactic acid. These were finally brought to boiling for several minutes and allowed to cool before being filtered.

EXAMPLE 9

| | Kgs. |
|---|---|
| Boric acid | 68 |
| Lactic acid (80%) | 64 |
| Slaked lime | 208 |
| Water | 660 |

The lime was mixed into the water and, into the homogeneous milk obtained, boric acid and then lactic acid were gradually poured. The product was let stand for 24 hours and was then stirred, after having compensated for the evaporated water, and passed to the homogenizer.

Solutions according to the invention have various uses. They can be utilized as such, more or less spread, or absorbed into an inert powder such as precipitated carbonate of lime or an infusorial earth to constitute a dry antifungal powder intended to be sprinkled on the objects to be protected or incorporated into other preparations as an antifungal charge; therefore the invention applies to every composition containing as antifungal principles the ternary combination specified above.

Some examples are given below showing different products of this type conforming to the invention:

EXAMPLE 10

There was dissolved at about the boiling point:

| | Kgs. |
|---|---|
| Boric acid | 100 |
| Triethanolamine | 575 |
| Laurylamine | 144 |
| Lactic acid (80%) | 90 |
| Water | 90 |
| Sodium dodecylbenzene sulfonate | 1 | and cooled with constant stirring. A very fine and very fluid antifungal emulsion was obtained.

EXAMPLE 11

These compositions can be incorporated in emulsions, creams, etc., without loss of their activity:

Melt separately the mixture:

| | |
|---|---|
| Hard crystalline wax | 35 kgs. |
| Soft finely crystalline wax | 17 kgs. 500 |
| Colophony | 8 kgs. 500 |
| Paraffin (50–52) | 37 kgs. 500 |

Here pour out the boiling mixture:

| | |
|---|---|
| Potassium carbonate | 11 kgs. 500 |
| Sodium soap | 10 kgs. |
| Water | 100 kgs. |

Maintain at boiling for 10 minutes, then add with stirring the previously prepared mixture:

| | Kgs. |
|---|---|
| Boric acid | 28 |
| Lactic acid (80%) | 25 |
| Triethanolamine | 200 |
| Water | 27 | and continue the agitation until solidification.

EXAMPLE 12

Antifungal pigments for water paints. The mixture:

| | Kgs. |
|---|---|
| Boric acid | 28 |
| Lactic acid (80%) | 23 |
| Copper hydroxide | 90 |
| Water | 180 | was left for 24 hours at ambient temperature with agitation from time to time.

At the end of this time it can be incorporated by grinding in most conventional types of water paints. If the color blue is an obstacle, the copper hydroxide can be replaced by zinc oxide in the proportion of 80 kgs. of zinc oxide for 90 kgs. of copper hydroxide.

According to the invention, these solutions or products can be prepared with very diverse concentrations according to their particular application, but the invention foresees that the content of boron derivative is preferably comprised between 3% and 15%.

A specific object of the invention is the process of protecting early fruits or vegetables, tobacco leaves, cheese rinds, etc., against molding and against drying out consisting in immersing, spraying or coating them by means of a solution in accordance with the invention.

In effect, the surprising and unpredictable discovery has been made that citrus and other fruits after immersion in the products of the invention are not only protected against microorganisms as explained above, but, even more, are protected against desiccation and do not lose weight in storage, which is of great economic importance.

Thus, there was immersed for 10 minutes in a 10% aqueous solution of the preparation:

| | Gr. |
|---|---|
| Boric acid | 100 |
| Lactic acid (80%) | 90 |
| Triethanolamine | 715 |
| Water | 95 | the contents of six cases of about 30 kg. of blood oranges. Five other cases were taken as controls. The whole was conditioned in a central fruitery at 4–5° C. for 3 months and each month they were weighed. The results were as follows:

| | Beginning of the Experiment | Loss of weight after a warehousing of— | | |
|---|---|---|---|---|
| | | 1 month, percent | 2 months, percent | 3 months, percent |
| Controls | 0 | 2.5 | 6.7 | 9.2 |
| Treated oranges | 0 | 0.03 | 0.4 | 0.8 |

The treated fruits continued turgescent whereas the control fruits were softened, shriveled, and partially dried up. This action was all the more surprising because it was known that boracic treatments often had the disadvantage of increasing on the contrary the transpiration of the fruits and of causing their desiccation (Lauriol: Fruits, 1954, 9.3.15).

For the process of treating fruit above specified, solutions were preferably employed such as those described in Examples 1–10, more particularly the solutions of Examples 1, 3, 4, 6 or 9 at dilutions of the order of 5 to 20%. More precisely, solutions of this type were employed in which the concentration of boric anion was of the order of 0.2% to 2%.

As soon as possible after harvesting, the fruits or other articles were treated preferably by soaking for a few minutes in a solution thus prepared and at an ambient temperature. After drying, they were put into cases and stored under the usual conditions at 4°–5° C. They preserved their turgescence and their freshness without loss of weight and were practically immune from attack by fungi.

Since there was used here about ten times less of boric compounds than in the standard procedures, another advantage must be emphasized, i.e., the absolute innocuousness of the treated products. The quantity of boron retained was, at most, of the same order as that normally encountered in fruits.

It follows that the invention is not limited to the described examples. In particular, the diversity of the possibilities of application of the solutions according to the invention does not permit of elucidation in detail or of indicating, with exactness, which solution is most particularly adapted to which particular application and which concentrations or which particular carrier requires this application. It will be readily understood by those skilled in the art, provided with the data set forth above, how to make the choice and appropriate adjustments without departing from the invention as described above.

I claim:

1. An anti-fungal product comprising, in synergistic combination, boric acid and an organic compound, in an amount of from about 0.2 to about 5.0 mols per mol of boric acid, selected from the group consisting of lactic acid, salicylic acid and propylene glycol; combined with water and sufficient base to provide a pH of between about 9 and 11.

2. An aqueous anti-fungal solution containing boric acid, lactic acid in an amount of from about 0.2 to about 5.0 mols per mol of boric acid, and sufficient triethanolamine to provide a pH of from about 9 to about 11.

3. An aqueous anti-fungal solution containing boric acid, from 0.2 to 5 mols of lactic acid per mol of boric acid, sodium chloride, and sufficient triethanolamine to produce a pH within a range of from approximately 9 to approximately 11.

4. An aqueous anti-fungal solution containing boric acid, from 0.2 to 5.0 mols of lactic acid for each mol of boric acid and sufficient caustic soda to provide a final pH of from about 9 to about 11.

References Cited in the file of this patent

UNITED STATES PATENTS

| | | |
|---|---|---|
| 228,016 | Artimini | May 25, 1880 |
| 258,001 | Barff | May 16, 1882 |
| 285,350 | Fickett | Sept. 18, 1883 |
| 423,875 | MacDonald | Mar. 18, 1890 |
| 626,435 | May | June 6, 1899 |
| 2,095,571 | Nichols | Oct. 12, 1937 |
| 2,183,981 | Bennett | Dec. 19, 1939 |
| 2,196,164 | Trowbridge | Apr. 2, 1940 |
| 2,210,133 | Sharma | Aug. 6, 1940 |
| 2,234,934 | Steinle | Mar. 11, 1941 |
| 2,275,659 | Steinle | Mar. 10, 1942 |
| 2,288,351 | Griffith | June 30, 1942 |
| 2,332,128 | Blondon | Oct. 19, 1943 |
| 2,382,546 | Curtis | Aug. 14, 1945 |
| 2,524,738 | Snell | Oct. 3, 1950 |
| 2,532,489 | Ferguson | Dec. 5, 1950 |
| 2,578,752 | Slade | Dec. 18, 1951 |
| 2,625,523 | Garber | Jan. 13, 1953 |
| 2,665,992 | Naps | Jan. 12, 1954 |

OTHER REFERENCES

Frear: A Catalogue of Insecticides and Fungicides, 1948, vol. II, page 55, 42 and 56.